Patented Nov. 12, 1940

2,220,930

UNITED STATES PATENT OFFICE 2,220,930

POLYMERIZATION OF HYDROCARBONS

Charles A. Kraus, Providence, R. I., assignor to Standard Oil Development Company, a corporation of Delaware No Drawing. Application November 3, 1938,
Serial No. 238,561

10 Claims. (Cl. 260—94)

This invention relates to the manufacture of hydrocarbons of high molecular weight by the polymerization of hydrocarbons of low molecular weight, in particular by the polymerization of hydrocarbons of the olefin series.

It has been proposed to form substantially saturated, linear, aliphatic hydrocarbons, having a molecular weight of 1,000 and upward, by the polymerization of iso-olefins at temperatures well below ordinary temperatures, in the presence of a metal halide catalyst, such as aluminum chloride. A catalyst of the type of aluminum chloride, however, is fairly insoluble in hydrocarbon oils, particularly at low temperatures. Such a catalyst could therefore be introduced into the oil only in the form of a solid, which involves difficulties in effecting good contact with the liquid before polymerization takes place, or in solution in a solvent miscible with the oil, in which case the effectiveness of the catalyst is impaired owing to the presence of the diluent. Catalysts of the type proposed thus present disadvantages in controlling the reaction and in arriving at conditions which may be necessary to secure desired polymers without waste of valuable catalytic material and undue contamination of the product.

It has now been found that the halides of certain members of the aluminum sub-group of group III of the periodic system of elements, specifically, aluminum, gallium and boron, having a part of their halogen atoms substituted by monovalent hydrocarbon groups, are suitable catalysts for the low temperature polymerization of olefin hydrocarbons, and that these compounds have the particular advantage, owing to the presence of the organic radicals, of being oil-soluble. The substituting hydrocarbon groups may be any monovalent groups, such as alkyl, aryl, aralkyl, alkyl-aryl, and various other types of cyclic radicals. The group of compounds contemplated in the present invention may be generically represented by the formula $MX_mR_n$, where M represents aluminum, gallium, or boron, X represents a halogen, R represents a monovalent hydrocarbon radical, $m$ and $n$ represent integers from 1 to 2, inclusive, and $m+n=3$. Examples of compounds of this general class are dimethylaluminum chloride, diethylaluminum chloride, methylaluminum dichloride, ethylaluminum dichloride, diphenyl-aluminum chloride, dibutyl-boron chloride, butyl-boron dichloride, dimethylgallium chloride and methylgallium dichloride.

In addition to the above described compounds, complexes of these compounds with inorganic halides or with ammonia or substituted ammonias are suitable catalysts for the purposes of the present invention. Examples of such complexes are methylaluminum dichloride-sodium chloride $(Al(CH_3)Cl_2.NaCl)$ and dimethylaluminum chloride-dimethylamine $$(Al(CH_3)_2Cl.NH(CH_3)_2)$$

A further class of compounds suitable as catalysts are those formed by the replacement of one or more halogens of the metallic alkyl halides of the present invention by an ether group, such, for example, as diethylethoxy aluminum $$(Al(C_2H_5)_2.OC_2H_5)$$

The compounds described above are suitable as catalysts in the polymerization of olefins generally, and they are particularly adapted to the polymerization of iso-olefins having the general formula $R(R')C=CH_2$, where R and R' represent alkyl radicals having one to four carbon atoms, such as iso-butylene, 2-methyl-1-butene, and the like. The catalysts are equally suitable for the polymerization of substituted olefins, such, for example, as iso-olefins of the above formula, in which one or more of the hydrogen atoms in the R or R' groups, or both, are substituted with halogen atoms. An example of such a substituted olefin is 2-methyl-3-chlorpropene. The catalysts described are also suitable for promoting the formation of copolymers, formed, for example, by the co-polymerization of a low molecular weight olefin and a low molecular weight di-olefin in the presence of a catalyst at a temperature below 0° C. The catalytic polymerization reactions, according to the present invention, are carried out at ordinary room temperatures or lower, and preferably below —50° C. in the case of the preparation of a very high molecular weight product. Products having molecular weights ranging from 1,000 or 3.000 up to 300,000, or even higher, may be formed by the herein described method.

It has been found that the catalyst is consumed in the process of polymerization, and that the amount of polymer formed in a given reaction is roughly proportional to the amount of catalyst added. The catalyst may, to a large extent at least, be removed by hydrolysis, as in treating with hot water, or with dilute acid, or with aqueous or alcoholic alkali solutions. It is possible that the catalyst or derivatives of it are entrained in the material as the reaction proceeds, and is not completely removed in the usual process of washing to remove unreacted catalytic material nor in the hydrolysis treatment. Owing to the relatively small amount of catalyst present in the material, however, the properties of the polymer are not appreciably affected by its presence, and the product formed possesses substantially the same properties as that formed by the action of other catalysts.

The hydrocarbon material to be polymerized should be free from ingredients which tend to poison catalytic reactions, such as organic sulfur compounds. When iso-olefins are to be polymerized, it has been found desirable to use a feed stock which is substantially free from normal olefins and di-olefins.

In carrying out the polymerization reactions according to the present invention, the material to be polymerized is placed in a reaction vessel and cooled to the desired temperature, for example by adding powdered dry ice directly to the reacting material. The catalyst, preferably pre-cooled, is then added very gradually, the reaction taking place immediately. The catalyst should be introduced in such a way as to secure immediate wide distribution in the hydrocarbon, such as by introducing it dropwise into the vigorously stirred liquid, or by other appropriate means. Since the reaction is exothermic, it may be desirable, if a considerable quantity of the polymer is to be formed, to maintain the reaction mixture at a low temperature by adding to this mixture a refrigerant, such as liquid ethane or propane, which will absorb the heat of reaction during the process of boiling off. In order to avoid the disadvantage of too great or permanent dilution of the reaction mixture, only enough of such a refrigerant should be added as will in boiling away absorb the expected heat of reaction. In the case of the formation of a co-polymer of different hydrocarbons, such as a co-polymer of isobutylene and butadiene, the hydrocarbons should first be mixed, the mixture cooled, and the catalyst then added to the cooled mixture.

The products formed in the reaction are usually plastic, rubber-like resins, depending on their molecular weight and chemical constitution, and they may be freed from unpolymerized hydrocarbon material or reacted catalyst by any convenient means, such as by washing with water and kneading in a kneading machine.

The formation of a polymerized product by the method of the present invention may be illustrated by the following example:

*Example*

A mixture of about equal parts of methyl aluminum dichloride and dimethylaluminum chloride was prepared by the method of Hnizda and Graus (Journ. Amer. Chem. Soc., vol. 60, p. 2276 (1938)), the product being a clear, colorless liquid, spontaneously inflammable in air. About one part by weight of this mixture was added, drop by drop, to about 200 parts by weight of iso-butylene, cooled to about −78° C. by adding powdered dry ice, the process being conducted in an atmosphere of carbon dioxide to prevent any contact of the catalyst with air or oxygen. A solid polymer formed and precipitated immediately. The weight of the product was approximately equal to 100 times the weight of the catalyst added. The product, after washing, was a colorless, plastic, somewhat tacky, rubber-like material, having an estimated molecular weight of about 10,000 to 20,000. The product is readily soluble in all aliphatic hydrocarbon solvents, as well as in halogenated aliphatic hydrocarbons, such as carbon tetrachloride, ethyl chloride, and the like; but it is generally insoluble in organic oxygen-containing compounds.

The description of the method of carrying out the present invention and accompanying example relate to a batch process. The invention is not limited to such a process, however, as it is equally well adapted to being carried out in a continuous process, in which the unpolymerized hydrocarbon material, and preferably also the catalyst, are pre-cooled and continuously brought into contact, while the polymerized product is continuously removed, means being provided for maintaining continuously the desired low temperature in the reaction zone.

It is not intended that the invention be limited to any specific examples which are presented here solely for the purpose of illustration, but is to be limited only by the appended claims, in which it is intended to claim all novelty inherent in the invention as broadly as the prior art permits.

I claim:

1. The method of polymerizing a hydrocarbon of the olefin series which comprises contacting said hydrocarbon at a temperature not higher than ordinary room temperature with a compound having the formula $MX_mR_n$, where M represents a member of the class consisting of aluminum, gallium, and boron, X represents a halogen, R represents a monovalent hydrocarbon radical, $m$ and $n$ each represent an integer from 1 to 2, inclusive, and $m+n=3$.

2. The method of polymerizing a hydrocarbon of the olefin series which comprises contacting said hydrocarbon at a temperature not higher than ordinary room temperature with a compound having the formula $AlX_mR_n$, where X represents a halogen, R represents a monovalent hydrocarbon radical, $m$ and $n$ each represent an integer from 1 to 2, inclusive, and $m+n=3$.

3. The method of polymerizing a hydrocarbon of the olefin series which comprises contacting said hydrocarbon at a temperature not higher than ordinary room temperature with a compound having the formula $MCl_mR_n$, where M represents a member of the class consisting of aluminum, gallium, and boron, R represents a monovalent hydrocarbon radical, $m$ and $n$ each represent an integer from 1 to 2, inclusive, and $m+n=3$.

4. The method of polymerizing a hydrocarbon of the olefin series which comprises contacting said hydrocarbon at a temperature not higher than ordinary room temperature with a compound having the formula $AlC_mR_n$, where R represents a monovalent alkyl radical, $m$ and $n$ each represent an integer from 1 to 2, inclusive, and $m+n=3$.

5. The method of polymerizing a hydrocarbon of the olefin series which comprises contacting said hydrocarbon at a temperature not higher than ordinary room temperature with a compound having the formula $AlCl_m(CH_3)_n$, where $m$ and $n$ each represent an integer from 1 to 2, inclusive, and $m+n=3$.

6. The method of polymerizing a hydrocarbon of the olefin series which comprises contacting said hydrocarbon at a temperature not higher than ordinary room temperature with dimethyl aluminum chloride.

7. The method of polymerizing a hydrocarbon of the olefin series which comprises contacting said hydrocarbon at a temperature not higher than ordinary room temperature with a mixture of approximately equal parts of dimethyl aluminum chloride and methyl aluminum dichloride.

8. The method of forming from a hydrocarbon of the olefin series a polymer having a molecular weight of at least 1,000 which comprises contacting said hydrocarbon at a temperature not higher than ordinary room temperature with a compound having the formula $MX_mR_n$, where M represents a member of the class consisting of aluminum, gallium, and boron, X represents a halogen, R represents a monovalent hydrocarbon radical, $m$ and $n$ each represent an integer from 1 to 2, inclusive, and $m+n=3$.

9. The method of forming from isobutylene a polymer having a molecular weight of at least 1,000 which comprises contacting said isobutylene at a temperature not higher than —50 C. with a compound having the formula $AlCl_mR_n$, where R represents a monovalent alkyl radical, $m$ and $n$ each represent an integer from 1 to 2, inclusive, and $m+n=3$.

10. The method of forming from isobutylene a polymer having a molecular weight of approximately 10,000 to 20,000 which comprises contacting said isobutylene at a temperature of approximately —78° C. with a mixture of approximately equal parts of dimethyl aluminum chloride and methyl aluminum dichloride.

CHARLES A. KRAUS.